March 1, 1966  J. L. HUITT ETAL  3,237,693
FRACTURING METHOD AND PROPPING AGENT
Filed Oct. 28, 1963
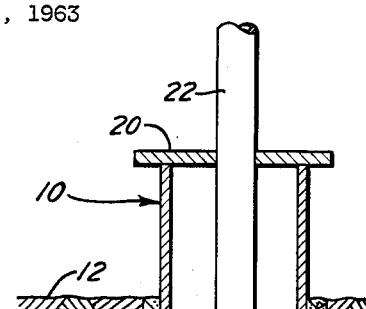
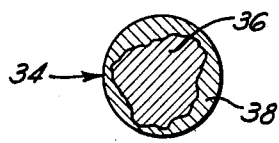
Fig.3
Fig.1
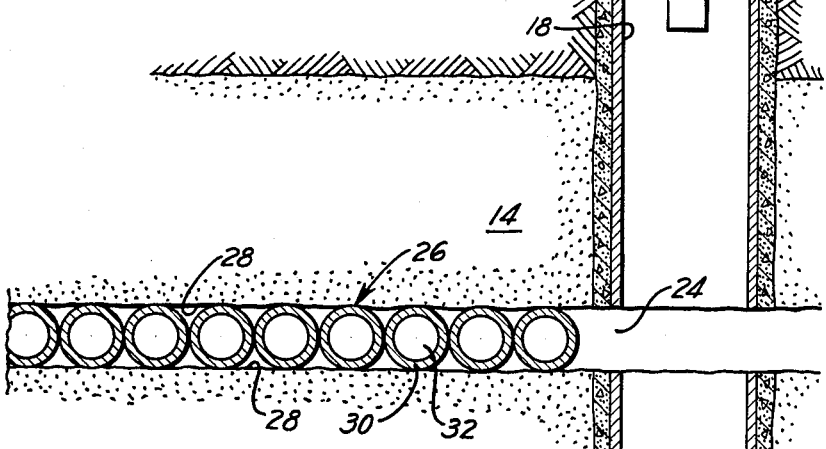
Fig.2
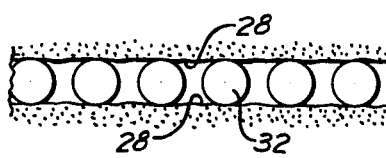
INVENTORS.
JIMMIE L. HUITT
JOHN PAPAILA
BY
ATTORNEY.

United States Patent Office 3,237,693
Patented Mar. 1, 1966

3,237,693
FRACTURING METHOD AND PROPPING AGENT
Jimmie L. Huitt, Glenshaw, and John Papaila, Apollo, Pa., assignors to Gulf Research & Development Company, Pittsburgh, Pa., a corporation of Delaware
Filed Oct. 28, 1963, Ser. No. 319,329
11 Claims. (Cl. 166—42)

This application is a continuation-in-part of United States applications for Letters Patent Serial No. 758,585, filed September 2, 1958, now U.S. Patent 3,173,484, and Serial No. 239,110 filed November 21, 1962, now abandoned. The invention described herein relates to a method for treating wells. It is more specifically concerned with the art of fracturing formations, and still more particularly with a process for creating fractures of high fluid flow capacity in underground formations penetrated by a well.

Within recent years hydraulic fracturing processes have been employed to create artificial fractures adjacent a producing well to increase the productivity of the fluid bearing formation. In general, such processes consist in forcing a fracturing fluid into a producing well in sufficient volume and under sufficient pressure to rupture the formation. The fracturing fluid is forced to enter the induced crack and extend the fracture for substantial distances into the formation. After the injection pressure has been released the fracture produced in the formation tends to close due to the weight of the overburden. In order to keep the fracture open, granular insoluble solids such as sand are usually suspended in the fracturing medium. The granular solids upon being carried into the fracture act as props and hold open the fracture after the injection pressure is released.

While the above-described fracturing process has received considerable commercial application, certain disadvantages inure to this practice which limits its effectiveness. Among these are that the particulated solids comprising the propping agent are not always distributed evenly throughout the induced fracture but rather tend to concentrate and agglomerate into a closely packed mass in certain areas of the fracture. As a consequence of the tendency of the particulated solids to agglomerate within the fracture in this manner, the permeability of the fracture is seriously reduced due to the inadequacy of the interstitial space between the solid particles for passage of formation fluids. The tendency of the propping agents to pack together is more pronounced near the borehole of the well. It is that area where the velocity of the liquids flowing through the fracture is highest when the well is on production; hence packing is often located where it interferes to the greatest possible extent with the flow of fluids into the well.

This invention resides in a method of fracturing a formation in which a novel propping agent comprising an inert solid particle coated with a removable material is displaced down a well and into a fracture. After placement of the propping agent in the fracture, the removable coating is removed to leave the inert particles spaced apart from one another in the fracture. In the preferred form of this invention, the novel propping agent is placed in the fracture in a partial monolayer and the coating is removed from the propping agent by dissolution of the coating in formation fluids.

In the drawings:

FIGURE 1 is a digrammatic illustration partially in vertical section of a well having the novel propping agent in position in a fracture before removal of the coating therefrom;

FIGURE 2 is a verticle sectional view of a portion of the fracture illustrated in FIGURE 1 after removal of the coating from the propping agent; and FIGURE 3 is a sectional view of an embodiment of this invention in which an irregularly shaped inert core is coated with a removable solid material to form a substantially spherical propping agent.

The inert material forming the core of the novel propping agent of this invention may be any of the solid materials conventionally used for propping agents. Sand is widely used as a propping agent and forms a suitable inert core for use in those instances in which the sand is capable of withstanding the crushing forces exerted by the faces of the fracture when the fluid pressure within the fracture is released. When the fracture to be propped is in a hard formation at substantial depths, the inert core should be of a material that is more resistant to crushing than sand. Suitable inert materials for forming the core of the propping agent subjected to such use are granular nutshells, particularly shells of black walnuts and pellets of aluminum or aluminum alloys. Ceramic particles, glass spheres, plastic particles, etc. also can be used as the inert core.

The coating around the inert core of the particles of propping agent should be insoluble, or slowly soluble, in the liquid used to transport the propping agent into the fracture to allow placement of the propping agent in the fracture before removal of the coating. A preferred coating material is one which is substantially insoluble in aqueous liquids used for fracturing operations but is soluble in oil. Then, when the well is placed in production, the flow of oil through the fracture removes the soluble coating material and leaves the inert particles in place in the fracture. Suitable oil-soluble coating materials for fracturing oil-bearing formations with aqueous fracturing liquids are naphthalene, anthracene, petroleum asphalt, gilsonite, hard waxes, such as flaked or granular beeswax, carnauba wax, microcrystalline hydrocarbon wax, hydrogenated animal and vegetable oils, resins, such as abietic acid, coumarone-indene resins, and the like.

Several of the coating materials mentioned above have the further property of having relatively low melting points, which melting points, however, are above the temperature reached by the fracturing fluid as the propping agent is placed in the fracture. Materials such as, for example, beeswax, carnauba wax, hydrogenated animal and vegetable oils, have low melting points which, in some instances, will cause removal of a coating of such material from an inert core after the propping agent has been placed in the fracture as the propping agent reaches the formation temperature. Such low melting point coatings also can be removed by displacement of a hot fluid from the well into the fracture. It is only essential in the embodiment of the invention in which the coating is removed by melting that the relative melting points of the coating material and the inert material forming the core of the propping agent be such that the coating material can be removed without impairment of the strength of the inert material.

If the propping agent is not be used in an oil-base fracturing fluid, water-soluble coating materials can be used. After transporting the propping agent into the fracture an aqueous liquid can then be displaced down the well and into the fracture to remove the water-soluble coating. In many instances, sufficient water is produced with the oil produced from the oil-bearing formation to dissolve the water-soluble coating without the necessity of the step of displacing an aqueous liquid into the fracture. Suitable water-soluble coating materials are sugar coatings, similar to those used in filled hard candies, and gelatin coatings. Water-soluble particles such as salt, sodium sulfate, and sodium carbonate in a water-soluble glue also are suitable water-soluble coatings. Any means of removing the coating material is satisfactory as long as it does not impair the inert core of the propping agent. For example, in some instances the coating material may be reactable with an acid and be removed by displacement of acid into the fracture following placement of the propping agent. It is apparent that the only requirements of the coating materials are that they be sufficiently hard and cohesive to remain on the inert core as the propping agent is transported into the fracture, have a low enough solubility in the fracturing liquid to prevent destruction before the propping agent is placed in the fracture, and have some characteristic which allows their selective removal without removal or destruction of the inert core.

The novel propping agents are granular particles having a size in the range from about 4 to 40 mesh. They have a Krumbein roundness and sphericity greater than 0.7, preferably exceeding 0.8, which can be readily obtained with coated particles, and facilitates displacement of large size particles into the fracture. Coated particles larger than 20 mesh in the U.S. Sieve Series are preferred. The coated particles used in a single fracturing job should be of a narrow range of particle sizes such as 4 to 8, 8 to 12, or 12 to 20 mesh spanning not more than five sizes in the U.S. Sieve Series. The thickness of the coating around the inert core of the particles of propping agent may range from about 10 percent to about 100 percent of the diameter of the inert particle. The coating may be applied by dipping the particles of the inert core in molten coating material, or spraying the inert particles with the coating material.

Referring to FIGURE 1 of the drawings, a well indicated generally by reference numeral 10 is illustrated extending downwardly from the surface of the ground 12 through an oil-bearing formation 14 to a total depth 16. The well is shown with casing 18 extending to the total depth. Casing 18 will ordinarily be cemented in the borehole of the well by conventional cementing procedures. The upper end of casing 18 is closed by a cap 20 provided with a central opening to receive a fracturing liquid supply line 22.

In a preferred embodiment of the fracturing method having the advantage of reducing the tendency of the propping agent to screen out, a horizontal notch 24 is cut in the casing at the desired level and a penetrating liquid such as dilute hydrochloric solution containing a surfactant is displaced down the well and through the notch 24. The penetrating liquid is followed by a propping agent-free fracturing liquid, preferably a liquid containing a fluid-loss additive adapted to reduce the flow of the liquid into the formation and form a seal along the faces of the fracture formed in the formation. Guar gum and karaya gum are effective fluid loss additives for water-base fracturing fluids. Finely divided oil-insoluble particles are added to oil-base fracturing liquids to reduce fluid loss. The pressure on the fracturing liquid is increased until breakdown of the formation occurs, as indicated by a drop in the pressure in the well. Displacement of the propping agent-free fracturing liquid into the formation is continued until sufficient fracturing liquid has been displaced into the fracture to extend it for the desired radial distance from the well. In some instances, it may be desirable to cause breakdown of the fracture by applying pressure to fluids in the well before the low fluid-loss fracturing liquid is introduced into the well. Fractures can also be made by displacing a liquid having the propping agent suspended in it down the well and increasing the pressure until breakdown of the formation occurs.

A suspension of the coated propping agent in a suitable liquid, which may be the fracturing liquid containing a fluid loss additive, and preferably is a viscous liquid to reduce the rate of settling of the propping agent, is pumped down the well and into the fracture behind the propping agent-free fracturing liquid at a rate preferably exceeding 10 barrels per minute. The concentration of the propping agent in the liquid used to transport it into the fracture is in the range of 0.1 to 5.0 pounds per gallon, and preferably 0.1 to 1.5 pounds per gallon. The concentration of propping agent in the liquid and the rate of displacement of the suspension of propping agent into the fracture are correlated with the calculated rate of leak-off of liquid from the fracture to deposit a partial monolayer of propping agent in the fracture. After the propping agent has been displaced into the fracture indicated generally by reference numeral 26, the pressure is released and the faces 28 of the fracture bear against the propping agent, as illustrated in FIGURE 1 of the drawings.

If the coating on the propping agent is soluble in the formation fluids, reduction of pressure within the borehole of the well causes flow of oil through the fracture into the well. The formation fluids pass in contact with the propping agent and dissolve coating 30 from an inert core 32 of the propping agent. Continued production through the fracture results in removal of the coating to leave the core 32 bearing against the faces 28 of the fracture, as illustrated in FIGURE 2. A comparison of FIGURE 2 with FIGURE 1 shows that in spite of the reduction of the width of the fracture, the total area available for flow has been increased by the removal of the coating which acts as a spacer separating the particles forming the inert core.

An important advantage of the coated propping agents is that a substantially spherical particle may be prepared even though the inert core is an irregular granular particle. It has been found that a high degree of roundness and sphericity of granular particles of propping agents is required to facilitate the displacement of the particles into and through the fracture. The roundness and sphericity is particularly critical when the propping agent comprises particles of walnut shells. However, rounding the particles of walnut shells to a roundness and sphericity, as determined by the method described in "Stratigraphy and Sedimentation" by Krumbein and Sloss, pages 78 through 83, published by W. H. Freeman Company, 1951 edition, to above 0.8 seriously increases the cost of the propping agents. Hence, this invention allows the use of crushed nutshells of relatively low roundness and sphericity, for example, of approximately 0.6, as defined by Krumbein and Sloss, as the inert core. The irregular particles are then coated to form particles substantially spherical in shape. When irregular inert particles are used in the preparation of the novel propping agent, the thickness of the coating will vary but should be adequate to produce a substantially spherical particle.

Referring to FIGURE 3, a particle of propping agent indicated generally by reference numeral 34 is illustrated having an irregular inert core 36. Surrounding the core 36 is a coating 38 of a removable material. The thickness of the coating 38 varies to correct the irregularities in the inert core 36 and provides a substantially spherical particle of propping agent 34.

The following experimental operations and data illustrate the advantages obtained by the use of the propping agents of the invention.

Sand particles of about 4 to 6 mesh were coated with a film of a petroleum asphalt. The asphalt film was applied by dipping the sand particles into molten asphalt and removing the sand particles from the molten asphalt and placing in water to cool the asphalt film and harden it. The average thickness of the asphalt coating was about 0.01 inch.

A simulated fracture was achieved utilizing two square brass plates which were found to offer approximately the same resistance to embedment of particles as did a typical hard earth formation. The surfaces of the plates were roughened by repeated crushing of said grains between them to simulate a fractured surface. The brass plates were fitted with side and end seals, a flow entrance and exit and pressure taps to form a flow cell. Propping agents were tested by placing monolayers of the propping agents in the flow cell in a somewhat random pattern that was controlled to the extent that no direct flow paths across the flow cell existed. The flow cell was then assembled and placed in a hydraulic press where th eplates were forced together to simulate a desired overburden pressure. Water was flowed through the cell and the flow capacity of the fracture calculated from the volume of water passing through the fracture and the pressure differential existing in the flow path from the inlet to outlet. This procedure simulates a fracture which is the principal conduit for the formation fluids to the well bore.

Utilizing this procedure, the asphalt coated sand particles were placed in the flow cell and water flowed through the cell. The flow capacity of the cell was determined as previously described and found to be 68,000 millidarcy feet. After determination of the original flow capacity, a crude petroleum oil was passed through the flow cell for a period of approximately 2 hours. The crude petroleum oil passing through the flow cell served to dissolve the asphalt coating leaving the sand particles within the simulated fracture. Following this procedure, water was again flowed through the cell and the flow capacity was again determined. The flow capacity was now found to be 120,000 millidarcy feet.

The coated propping agent of this invention is highly advantageous in guaranteeing spacing between individual particles of propping agent after the coating has been removed. Because each particle forming the inert core has a coating surrounding it, the inert cores of adjacent particles in a monolayer cannot touch. In contrast, the use of mixtures of particles of different compositions wherein some of the particles are removable and others permanent has no means of assuring that the permanent particles will not lie adjacent one another in the fracture and form a tightly packed mass which may impede flow through the fracture. Moreover, in a mixture of particles of different compositions, the more dense particles will tend to settle from the transporting fluid at a higher rate and thereby aggravate the tendency to pack in the fracture.

We claim:

1. A propping agent for holding open fractures in subsurface formations, each particle of propping agent comprising an inert core having a roundness and sphericity less than about 0.7 and a strength adequate to withstand the overburden pressure without substantial crushing, a coating of spacing material on the core having a thickness of from about 0.1 to about 1.0 times the diameter of the inert core, said coating being readily soluble in formation fluids, and said coated propping agent having a roundness and sphericity higher than about 0.8.

2. A method of fracturing a formation penetrated by the borehole of a well comprising displacing a liquid free of propping agent down the well and into contact with the formation, increasing the pressure on the liquid free of propping agent to break down the formation and create a fracture therein extending from the well, displacing a liquid containing a fluid loss additive down the well and into the fracture to extend the fracture for the desired distance from the well and seal the faces of the fracture, displacing a liquid having a propping agent suspended therein into the fracture, the concentration of propping agent in the liquid and the rate of displacement of the liquid into the fracture being adapted to place a monolayer of particles of propping agent in the fracture, said propping agent comprising an inert core having a strength adequate to withstand the overburden pressure on the formation without substantial crushing, said core having a coating of a readily removable spacing material that is substantially insoluble in the liquid in which the propping agent is suspended, said coating having a thickness within the range of from about 0.1 to about 1.0 times the diameter of the core, reducing pressure on the liquids in the well whereby the formation fracture faces close on the propping agent and hold the propping agent in place, and thereafter passing a liquid through said fracture to remove the coating from the inert core and thereby leave each core separated from adjacent cores in the fracture by distances of at least about 0.2 times the diameter of the cores.

3. A method of treating an underground formation penetrated by a well to increase the fluid flow capacity of said formation into the well comprising creating a fracture extending from the well into the formation, displacing into the fracture a propping agent suspended in a liquid to deposit a monolayer of propping agent in the fracture, said propping agent having an inert core having a strength adequate to withstand the overburden pressure on the formation without substantial crushing, said core being surrounded by a coating of readily removable spacing material resistant to the liquid in which the propping agent is suspended, said coating having a thickness within the range of from about .01 to about 1.0 times the diameter of the core, releasing pressure on the liquid in the well whereby the faces of the formation fracture close to hold the propping agent in place, and treating the propping agent while in the fracture to remove the coating from the core of inert material and leave each core separated from adjacent cores in the fracture by distances equal to at least the combined thicknesses of the coatings on adjacent cores.

4. A method as set forth in claim 3 in which the liquid in which the propping agent is suspended is an aqueous liquid and the removable coating is soluble in oil.

5. A method as set forth in claim 3 in which the liquid in which the propping agent is suspended is an oil and the removable coating is soluble in water.

6. A method as set forth in claim 3 in which the inert core comprises particles of shells of black walnuts and the removable coating is soluble in oil.

7. A method as set forth in claim 3 in which the inert core comprises particles of nutshells and the coating is soluble in oil.

8. A method as set for in claim 3 in which the inert core comprises particles of sand, the removable coating is an oil-soluble material, and the propping agent is treated in the fracture by flowing oil through the fracture to remove the oil-soluble coating.

9. A metheod as set forth in claim 3 in which the removable coating has a lower melting point than the inert core, and the propping agent is heated in the fracture to a temperature higher than the melting point of the coating and lower than the melting point of the inert core to remove the coating from the core.

10. A particulate propping agent for use in fracturing subsurface rock formations comprising granular particles of black walnut shell, each particle having a coating of a solid spacing material that is resistant to liquids used to transport the propping agent into the fracture, said coating having a thickness within the range of from about 0.1 to about 1.0 times the largest diameter of the particle of black walnut shell, said spacing material being readily removable from the particle of black walnut shell while in the fracture to position each particle of black walnut shell a distance from adjacent shell particles that is at least about 0.2 times the largest diameter of adjacent shell particles, the roundness and sphericity of each coated particle of propping agent being substantially higher than those of the particle of black walnut shell and being at least about 0.8.

11. A method of increasing production from a fluid-bearing formation penetrated by the borehole of a well comprising creating a fracture extending from the borehole into the formation, displacing down the well and into the fracture a carrier liquid having a propping agent suspended therein, depositing in the fracture a monolayer of the propping agent, said propping agent comprising granular hard inert cores having a strength adequate to withstand the overburden pressure on the formation without substantial crushing, each core having a removable coating of spacing material that is readily soluble in formation fluids and substantially insoluble in the carrier liquid, said coating having a thickness within the range of from about 0.1 to about 1.0 times the diameter of the core, and reducing pressure in the well whereby the formation fracture faces close on the propping agent to hold the propping agent in place and whereby formation fluids flow through the fracture to remove the coating from the propping agent and leave the inert cores spaced apart from each other in the fracture by distances of at least about 0.2 times the diameter of the cores.

References Cited by the Examiner

UNITED STATES PATENTS

| | | |
|---|---|---|
| 2,823,753 | 2/1958 | Henderson et al. ___166—42.1 X |
| 2,879,847 | 3/1959 | Irwin _____166—42.1 |
| 2,950,247 | 8/1960 | McGuire et al. ____166—42.1 X |
| 3,026,938 | 3/1962 | Huitt et al. _____166—42.1 |
| 3,121,464 | 2/1964 | Huitt et al. _____166—42.1 |

CHARLES E. O'CONNELL, *Primary Examiner.*

BENJAMIN HERSH, *Examiner.*